United States Patent Office 3,330,885
Patented July 11, 1967

3,330,885
ENCAPSULATED HALOPHORS AND METHODS
FOR MAKING SAME
Philip B. Dalton, Franklin Square, N.Y., and Leon Katz, Springfield, N.J., assignors to General Aniline & Film Corporation, New York, N.Y., a corporation of Delaware
No Drawing. Filed June 5, 1964, Ser. No. 373,097
6 Claims. (Cl. 260—878)

This invention relates to new compositions, and in particular to halophors in encapsulated form whereby outstanding and unusual properties are forthcoming leading to utilities in a variety of areas not heretofore available, and still more particularly to iodophors in encapsulated form, and to shaped structures derived therefrom.

The use of halogens, and particularly chlorine and iodine as germicidal agents is well known. Iodine as such or in various molecular combinations has been used as a germicide or bactericide for a great many years. In various forms it is an outstanding germicide for the skin, for wounds both internal and external, for sterilization purposes including such things as surgical instruments and as a general or broad spectrum therapeutic agent against diseases caused by viruses, fungi and bacteria. It has also been used to disinfect drinking water, swimming pools and the like, and to sanitize heating utensils and other objects which might come in contact with organic material subject to decay and bacterial attack. Iodine is an outstanding therapeutic agent which is useful against a great variety of organisms such as viruses, bacteria, spores, yeast, molds, protozoa, fungi, worms, nematodes and the like. Iodine, however, has one serious drawback and that is related to the fact that it is a strong primary irritant and a sensitizer. In addition, iodine, also, while it destroys bacterial protein, also destroys animal including human protein as well. As a consequence, often, the use of iodine on the skin may create more damage than benefit as a result of ulcers which may form, which delay healing.

The discovery of compounds which act as carriers for halogens, and particularly such compounds as polymeric-N-vinyl pyrrolidone has resulted in the provision of an active bactericide in which the toxic and irritant properties of the halogen are markedly reduced or almost entirely eliminated. At the same time, the effectiveness of the halogen as a killing agent is not diminished and in many instances is actually enhanced by the combination with such carrier agents.

Among the defects, however, of these iodophor combinations is the instability and rapid release of the halogen in most of the useful applications thereof. Thus, the addition of an iodophor to a large volume of water to be treated to destroy bacteria and the like results in the rapid release of active iodine over a very short period of time, resulting in a septic situation which, however, is relatively short-lived due to the fact that any further contaminants thereafter are not capable of destruction by the iodine.

It has now been discovered that halophor-containing materials, and in particular iodophors, may be prepared in a form wherein the release of the active form of halogen is carefully controlled and slowed down so that the germicidal effect may be extended over extremely long periods of time.

It is therefore an object of the present invention to provide halophoric compositions which provide for the gradual and prolonged release of active halogen therefrom.

It is another object of the present invention to provide halophoric compositions of matter in an encapsulated form whereby the active halogen content thereof may be sustained over long periods of time.

It is still another object of the present invention to provide encapsulated halophors which permit the sustained release over prolonged periods of time of active forms of halogen whereby the benefits and utilities may be applied to applications not available with the halophors as originally provided.

It is still another object of the present invention to provide halophor compositions of matter in the form of selected structural forms and shapes which permit the use thereof in various applications where it is desirable or necessary to provide an active form of halogen over prolonged periods of time.

It is still another object of the present invention to provide processes for the production of encapsulated halophors.

It is still another object of this invention to provide processes for the preparation of halophor compositions which are characterized by the sustained and prolonged release of an active form of the halogen.

It is still another form of this invention to provide processes for the production of halophoric compositions of matter in selected shaped structures whereby an active form of halogen may be provided over sustained periods of time.

Other objects will appear hereinafter as the description proceeds.

The halophoric materials with which the present invention is concerned are those well known halophor products derived from the combination of halogen atoms, and particularly chlorine and iodine with a carrier, and more particularly a high molecular weight carrier such as is exemplified by polyvinyl pyrrolidone, polyvinyl oxazolidone, polyvinyl imidazole, polyvinyl morpholone, polyvinyl caprolactam, and various copolymers, interpolymers and graft copolymers including such chemical structures and other polymers, copolymers, interpolymers and graft copolymers derived from vinylated lactams of which those above specified are examples. In addition to the general class of polymeric vinyl lactams, other broad classes of carrier materials suitable for the production of halophoric materials include the high molecular weight oxyalkylene derivatives of reactive hydrogen compounds, which derivatives are generally characterized as the alkylene oxide condensates having surface active properties. Included within this latter group of surface active materials are the ethylene and propylene oxide condensates with alcohols, amides, and phenols, as well as the mixed ethylene propylene oxide condensates, and further including those condensation products which are commercially available and known as Pluronics. Still further, the halophoric compositions which are herein contemplated are further characterized as solid materials under ambient conditions.

The halogen content of the halophoric composition of matter is not critical and may vary from as little as a fraction of 1% to 50% or more. It is preferred, however, to employ those halophors which contain from about 5 to 20% by weight of halogen.

The general procedure for producing the encapsulated halophor compositions of this invention comprises polymerizing a suitable and selected ethylenically unsaturated compound in the presence of the halophor material whereby the latter is obtained in encapsulated form. Any suitable procedure for effecting the polymerization may be resorted to but it is preferred to carry out the process while maintaining the halophor as a suspension in an inert liquid and in the presence of a suitable catalytic agent contacting the thusly suspended halophor with the monomeric form of the ethylenically unsaturated compound. The latter in the presence of the catalytic agent and under specified conditions of temperature, pressure, and the like, undergoes polymerization in the usual manner on the surfaces of the halophor, and this results in an encapsulated form.

The ethylenically unsaturated compounds which are preferred for use in the production of encapsulated halophors and in the processes of the present invention are those ethylenically unsaturated compounds which may be polymerized by ionic catalysts and include particularly:

Olefins such as ethylene, propylene and butylene
Styrene and alkyl-substituted styrene
Acrylate
Methacrylates
Acrylonitrile
Vinyl esters such as vinyl chloride and vinyl acetate
Vinyl ethers While many of the aforementioned types of ethylenically unsaturated compounds normally require relatively stringent conditions of temperature and pressure to effect the polymerization thereof, it has also been found that by the use of certain specific catalyst systems, these compounds may be used in the processes of the present invention whereby less stringent conditions of temperature and pressure are to be employed.

These catalyst systems are the preferred ionic polymerization catalyst combinations which are commonly described as Ziegler type catalysts and are more particularly definable as combinations of organometallic compounds on the one hand with a transition metal halide or ester on the other hand. The preferred organometallic compounds are those wherein the metal is from one of the first three groups of the Periodic Table of Elements, and the organic moiety of these compounds is alkyl, aryl, aralkyl, alkaryl, and where the metal is multivalent and more than one organic group is associated with each atom of metal, then there may be additionally present as organic radicals alkoxy, hydrogen, halogen, aralkoxy, acyloxy and the like. The transition metals are those of Groups IV, V and VI of the Periodic Table of Elements and of these the preferred metals are titanium, zirconium, vanadium, chromium and molybdenum. While such Ziegler type systems are generally thought to be two-component systems, it is clear that more than one of each of the aforementioned types may be present to give a multicomponent catalyst system.

By the employment of multicomponent catalyst systems of the type above described, the polymerization, particularly of the olefinic compounds, and more particularly of the $\alpha$-olefins, may be effected under relatively mild conditions of temperature, i.e., between about 10° C. up to about 120° C., and preferably between about 20° C. to about 100° C. The polymerization reaction with such catalysts and monomers proceeds readily at these temperatures under normal atmospheric conditions of pressure, but higher pressures may be employed if desired. The ratio of the two components of the catalyst system on a molar basis is not particularly critical but it is preferred that at least about 0.5 mole of the organometallic compound be present for each mole of transition metal compound, and most preferably, there should be present from about 1 mole upwards to about 10 moles of organometallic compound per mole of transition metal compound.

The amount of catalyst which is effective to polymerize the monomers employed in the processes of this invention is again not critical but it is preferred to use amounts varying from about 0.001% by weight to about 1% by weight based on the weight of the monomer to be polymerized. Of more significance and of greater criticality is the amount of catalyst relative to the halophoric compound to be encapsulated. This can be readily ascertained from the fact that in order to obtain polymerization throughout the solid mass of halophor compound and in integrally bonded association therewith there must be present enough reactive catalyst sites throughout the mass of halophor compound to effect a relatively uniform degree of encapsulation. Consequently it is preferred that there be present at least about 0.01 millimole of catalyst per gram of halophoric compound and no more than about 5.0 millicoles per gram of material to be encapsulated.

The general procedure for effecting the encapsulation of the halophoric compounds employed in the processes of this invention involves the treatment of the halophoric material in a substantially anhydrous condition and in the solid state with the ionic catalyst and, as pointed out above, preferably a two-component Ziegler type catalyst system. The thusly treated solid halophor is then contacted with the ethylenically unsaturated polymerizable monomer at atmospheric pressure or at somewhat elevated pressures if desired, in a suitable reaction vessel and at temperatures varying from about 10° C. to about 120° C. Polymerization of the monomer is thusly effected in intimate and integrally bonded association with the halophor base. The amount of polymer relative to the halophor material can obviously be varied from a minor amount, i.e., 1 to 10% by weight based on the weight of the halophor, up to a major amount, i.e., 50 to 90% by weight of polymer based on the total weight of the resultant composition. The period for the polymerization process will vary depending upon the temperature and pressure employed as well as the amount of monomer to be polymerized. The reaction times thus will vary from about 30 minutes to about 20 hours, depending upon these factors. The preferred method for contacting the catalyst treated halophor with the monomer is to pass the gaseous monomer into the reaction vessel containing the halophor. Where the preferred monomers such as the $\alpha$-olefins are employed, such a technique is particularly suitable since these, under normal conditions of temperature and pressure or at slightly elevated temperatures, are gases or low boiling liquids. As the monomer is introduced and makes contact with the catalyst treated halophor within a closed reaction vessel, polymerization of the monomer occurs rapidly and therefore the monomer may be fed slowly into the reaction zone depending upon the desired pressure built up and the rate at which it is converted to polymer. While it is not essential in the processes of the present invention, nevertheless it is desirable to employ an inert liquid suspending medium for the halophor compound. By the use of such a liquid, the polymerization reaction is more readily controlled and a more uniform distribution of polymer is obtained throughout the halophor mass. By inert is meant a substance which will neither interfere with the polymerization process nor adversely affect the physical state of the halophor compound. It is also highly preferable that the liquid be a non-solvent for the polymer as well, since such a solvent property would obviously interfere with the formation of the desired polymer capsule. In many instances, however, it may not be undesirable for the solvent to have a slight plasticizing or swelling action on the polymer depending upon the ultimate treatment to be given to the encapsulated products, as will be more fully described hereinafter.

By virtue of the above described general procedure, it is possible to obtain solid halophor compounds in intimate association with varying amounts of polymer in such a physical state that to a great extent the halophor is protected against environmental influences and the release of halophor may be delayed and thereby prolonged. In order, however, to obtain the greatest benefits from the encapsulated halophors hereinbefore described, it is most preferable to thereafter treat the particulate product obtained by the above described processes to a pressure or melting operation, with or without heat, whereby a sheet-like product is produced. Contrary to all expectations, such a sheet-like product, even where the amount of polymer is relatively high and the sheet material has the normal appearance of a plastic product, will release substantially all of the available halogen content of the halophor compound at a relatively constant rate over a prolonged period of time, thereby adapting such products for uses where the germicidal activity of the halogen is desired and necessary over an extended period of time. This property of the thusly produced shaped structure of polymer and halophor is in sharp contradistinction to resin sheets produced merely by milling the halophor material into the resin and thereafter forming a sheet from this mixture. Very little, if any, halogen is available and is released from such a product notwithstanding the fact that it may contain as much as 80% halophor compound. The available halogen of the halophor is that amount of halogen which is available and releasable as elemental halogen and is to be distinguished from free halogen, halide ion or bound halogen. Available halogen is determined directly by standard analytical means. Thus, iodine is determined by titrating in aqueous medium with 0.1 N sodium thiosulfate solution using Harch as an indicator. Iodide is determined by reducing the product in solution with 1 N sodium bisulfite until colorless, adding 0.1 N silver nitrate and enough nitric acid until acidic and back-titrating with ammonium thiocyanate. The iodide ion is the difference between this figure and available iodine. Total iodine may be determined by a combustion method such as that formulated by Hallet in Scott's "Standard Methods of Chemical Analysis." The difference between total iodine and the sum of iodide plus available iodine is bound iodine (i.e., in the organic moiety—not available and not as iodide).

The following examples will serve to illustrate the present invention without being limitative thereof. Parts are by weight unless otherwise indicated.

*Example 1*

50 g. of substantially anhydrous polyvinyl pyrrolidone-iodine complex containing 20% available iodine in finely powdered form is dispersed in 1000 ml. of dry toluene. The dispersion is placed in a suitable reaction vessel and swept with nitrogen to remove all of the air. There is then added 0.05 mole of titanium tetrachloride and after 5 minutes of stirring, there is further added 0.1 mole of methyl magnesium bromide. These procedures are carried out at room temperature under atmospheric pressure. The temperature of the reaction vessel is then raised to about 50° C. and ethylene gas is passed through the suspension. The flow of ethylene is continued until the rate of absorption has substantially ceased. This occurs after about five hours. The resultant suspension is then cooled to room temperature, filtered and washed with methanol. After drying, the resultant particulate product is found to contain 52.8% polyethylene by weight and an available iodine content of 8.17%. This is equivalent to an available iodine content of 17.3% discounting the polymer indicating only a slight loss of available iodine as a result of the entire polymerization and encapsulating procedure. The aliquot portion of this product is pressed in a Carver press at 100° C. at 10,000 p.s.i. (1.25 in. ram) for 30 seconds between aluminum foil to produce a film. The resultant film is then immersed in distilled water and is found to release about 7.2% iodine (available iodine) at a relatively uniform rate over a period of about 24 hours. The less than 1% decrease in available iodine in the pressed film is indeed remarkable especially since about this quantity is lost in the molding operation itself.

*Example 2*

The procedure of Example 1 is repeated except that the amount of catalyst is reduced to 0.01 mole of titanium tetrachloride and 0.02 mole of methyl magnesium bromide. After three hours no further ethylene is absorbed and the resultant encapsulated halophor after isolation as in Example 1, is found to contain 12.2% polyethylene and an available iodine content of 16.03% (discounting the polymer). A film is pressed as in Example 1 from this product and it is found that about 13.7% of available iodine is released uniformly over a period of about 3 hours.

The sustained release of the iodine from the sheeted products in Examples 1 and 2 is to be contrasted with the immediate and instantaneous release of all available iodine when the halophor itself (polyvinyl pyrrolidone-iodine complex containing 20% available iodine) is immersed in distilled water.

*Example 3*

Example 1 is repeated employing in place of the polyvinyl pyrrolidone-iodine complex of that example, wherein the polyvinyl pyrrolidone has a K value of 30, the following halophoric compositions:

(a) Polyvinyl pyrrolidone-iodine complex (20% available iodine, polymer K value=60)
(b) Polyvinyl pyrrolidone-iodine complex (20% available iodine, polymer K value=90)
(c) Polyvinyl pyrrolidone-iodine complex (10% available iodine, polymer K value=30)
(d) Polyvinyl pyrrolidone-iodine complex (5% available iodine, polymer K value=45)
(e) Polyvinyl pyrrolidone-iodine complex (30% available iodine, polymer K value=50)
(f) Pluronic F-68-iodine complex containing 10% available iodine (Pluronic F-68 is a condensate of polypropylene oxide and ethylene oxide, the polypropylene oxide portion of the molecule having a molecular weight of about 1600–1800 and the condensate containing about 80% by weight of ethylene oxide)
(g) Pluronic F-68-iodine complex containing 4% available iodine
(h) Vinyl pyrrolidone (90% by wt.)-vinyl stearate (10% by wt.) interpolymer-iodine complex containing 2.8% available iodine
(i) Vinyl pyrrolidone (90% by wt.)-vinyl chloride (10% by wt.) interpolymer-iodine complex containing 1.4% available iodine
(j) Vinyl pyrrolidone (90% by wt.)-vinyl stearate (10% by wt.) interpolymer-iodine complex containing 15% available iodine
(k) Vinyl pyrrolidone (76% by wt.)-vinyl pyridine (24% by wt.) interpolymer containing 12% available iodine
(l) Polyvinyl oxazolidone (M.W.=15,000) containing 35.4% available iodine
(m) Polyvinyl oxazolidone (M.W.=60,000) containing 5% available iodine
(n) Polyvinyl oxazolidone (M.W.=25,000) containing 15% available iodine and 10% available bromine The particulate products which result, in each instance, give a sustained release of halogen, similarly as in Example 1, and the pressed films also behave in a like manner.

*Example 4*

Example 1 is repeated employing as the catalyst system 0.02 mole of titanium tetrachloride and then 0.06 mole of triisobutyl aluminum. The resultant product contains about 40% polyethylene.

*Example 5*

Example 1 is again repeated except that the methyl magnesium bromide is added 20 minutes after the titanium tetrachloride. The product which results contains 63% polyethylene.

*Example 6*

Example 1 is once again repeated using 75 g. isoprene in place of ethylene. After the isoprene is added, there is a gradual and moderate rise in the temperature of the reactants from 25° C. to about 40° C. After the exotherm ceases, heat is supplied until a temperature of 75° C. is reached, and then it is maintained thereat for 45 minutes. The final product contains about 18% polyisoprene.

Example 7

Example 1 is again repeated using the following catalyst systems:

(a) 0.01 mole of dibutoxy titanium dichloride followed after 10 minutes with 0.05 mole triethylaluminum
(b) 0.03 mole chromium trichloride followed after 1 hour with 0.06 mole of triethylaluminum
(c) 0.04 mole vanadium trichloride followed after 5 minutes with 0.05 mole triisopropyl aluminum
(d) 0.06 mole of zirconium tetrachloride followed after 15 minutes with 0.05 mole of n-butyl lithium
(e) 0.05 mole of zirconium tetrachloride followed after 25 minutes with 0.02 mole of diethyl cadmium

Example 8

Example 1 is repeated using propylene in place of ethylene in an autoclave. Instead of passing the gas through the reaction vessel as in Example 1, the autoclave is pressured to 150 p.s.i.g. with propylene and after the pressure has dropped to 60 p.s.i.g., it is again pressurized to 120 p.s.i.g. After 6 hours the pressure has dropped to about 50 p.s.i.g. The resultant product contains 45% polypropylene.

Example 9

Examples 4 through 8 are repeated employing the halophors of Example 3.

Example 10

Example 1 is repeated using the following inert solvents in place of toluene:

(a) Benzene
(b) Xylene
(c) n-Heptane

In the above examples, certain specific reactants and reaction conditions have been set forth but it is clear that any solid halophoric materials within the scope of the present disclosure can be used. It is further clear that many different catalyst combinations can be employed in addition to those specifically exemplified, and especially those coming within the ambit of the broad teachings herein described. Thus, in place of methyl magnesium bromide of Examples 1, 2 and 3, one may employ ethyl magnesium bromide, isopropyl magnesium bromide, phenyl magnesium bromide and the like. In place of the exemplified triisobutyl aluminum and triethyl aluminum in some of these examples, one may substitute equivalent amounts of other trialkyl aluminum such as triamyl aluminum as well as alkyl aryl aluminum compounds such as dimethyl phenyl aluminum, diethyl phenyl aluminum, diethyl benzyl aluminum, diphenyl ethyl aluminum, dibenzyl isopropyl aluminum, methoxy diphenyl aluminum, dimethyl aluminum hydride, diisopropyl aluminum hydride, diisopropoxy ethyl aluminum, diethyl aluminum chloride, diethyl benzyloxy aluminum, dibutyl magnesium, isobutyl sodium isopropyl lithium, diethyl calcium, diisopropyl calcium and the like. Still further, the conditions for carrying out the integrated polymerization may be varied as indicated in the general description and within the limits thereof with respect to temperature and pressure. Finally, in addition to the exemplified olefinic compounds employed in the polymerization procedure, any of the other disclosed monomeric materials may be used with suitable catalyst systems therefor.

Other variations in and modifications of the described processes which will be obvious to those skilled in the art can be made in this invention without departing from the scope or spirit thereof.

We claim:

1. A halophoric composition of matter characterized by a sustained and prolonged release of halogen comprising a finely divided, particulate halophoric compound and substantially but not completely surrounding each particle of said halophoric compounds and in integral association therewith and in conformance to the shape of said individual particles, a polymer of an ethylenically unsaturated polymerizable monomer.

2. A composition of matter as defined in claim 1 wherein the halophoric compound is a polyvinyl pyrrolidone-iodine complex and the polymer is polyethylene.

3. A molded, self-sustained article consisting essentially of particles of solid halophoric compound, each of said particles being substantially but not completely surrounded by a polymer of an ethylenically unsaturated polymerizable monomer, said article being characterized by a sustained and prolonged release of halogen.

4. A halophoric composition of matter characterized by a sustained and prolonged release of halogen comprising a finely divided, particulate halophoric compound and substantially but not completely surrounding each particle of said halophoric compound and in integral association therewith and in conformance to the shape of said individual particles, a polymer of an ethylenically unsaturated polymerizable monomer, said composition containing not more than about 90% by weight of said polymer based on the total weight of said composition.

5. A composition of matter as defined in claim 4, wherein the halophoric compound is a polyvinyl pyrolidone-iodine complex and the polymer is polyethylene.

6. A molded, self-sustained article consisting essentially of particles of solid halophoric compound, each of said particles being substantially but not completely surrounded by a polymer of an ethylenically unsaturated polymerizable monomer, said article being characterized by a sustained and prolonged release of halogen, and said article containing not more than about 90% by weight of said polymer based on the total weight of said article.

References Cited

UNITED STATES PATENTS 2,739,922  3/1956  Shelanski _____ 167—17
3,138,478  6/1964  Hedman et al. _____ 260—878

MURRAY TILLMAN, *Primary Examiner.*

D. J. BREZNER, *Assistant Examiner.*